United States Patent Office 3,398,112
Patented Aug. 20, 1968

3,398,112
ONE-COMPONENT SILOXANE ELASTOMER
Wendell L. Johnson, Elizabethtown, Ky., and Marcus E. Ross, Midland, Mich., assignors to Dow Corning Corporation, Midland, Mich., a corporation of Michigan
No Drawing. Filed June 1, 1965, Ser. No. 460,557
5 Claims. (Cl. 260—37)

ABSTRACT OF THE DISCLOSURE

Room temperature curing silicone rubber compositions which when cured have tensile strengths upwards of 800 p.s.i. and tear strengths of upwards of 150 pounds per inch and which are easily extruded in the uncured state are obtained by using the combination of silicone polymer having substituents of the formula —ON=$CR_2$ and a carbon black having an average particle diameter of less than 50 millimicrons and a structure index of from 130 to 200.

---

This invention relates to improved one-component room temperature curing organosiloxane elastomers (hereinafter called one-component RTV elastomers) containing carbon black.

One-component RTV organosilicon elastomers have met with wide commercial success as caulking compounds, sealants, coating compositions and potting materials. They have the advantage in that it is only necessary to apply the material to the place where it is to be used and allow it to cure. This avoids the necessity of mixing materials at the job site and also avoids the danger of catalyzed materials setting up before they can be used. The latter is an ever present danger with a two-component room temperature curing system in which the material cures spontaneously on addition of a catalyst.

In the so-called one-component systems, any catalyst can be added at the time of compounding of the material and if it is kept free of moisture, no curing will take place while in the container. However, the one-component RTV silicone elastomers have been characterized by relatively poor stress-strain properties, that is, the tensile strengths were in the order of 500 p.s.i. and the tear strengths in the order of 25 to 30 pounds per inch. For many applications such properties are eminently satisfactory but for those applications in which the rubber is subjected to abrasion or to heavy mechanical stress, such properties often prove unsatisfactory. As a result, there has been a major attempt for many years to improve the physical properties of such materials.

Attempts to do this with the reinforcing silica fillers which are normally used in peroxide vulcanized silicone rubbers have not solved the problem. This is true, among other reasons, because to be useful a one-component RTV rubber must be extrudable. That is, it should be easily extruded from the container into the void to which it is being applied. When reinforcing silica fillers are employed in amount sufficient to give improved physical properties, the compounds lose their extrudability. This is true even though silica fillers are employed which have been treated with organosilanes or siloxanes. Neither can the problem be solved by adding plasticizers to the formulation as is normally done with peroxide vulcanized silicone rubbers. In addition, attempts have been made to improve the physical properties of one-component RTV silicone rubbers by using carbon black as a filler. Here again in the past, the results were essentially the same as those with the reinforcing silica fillers, namely, either there was no improvement in the 500 pound tensile and the 30 pound tear or the material would become nonextrudable or both.

Applicants have found most unexpectedly that a combination of the particular carbon black hereinafter described with the particular ketoxime siloxanes hereinafter described produces one-component RTV silicone elastomers which have long shelf stability (that is, they remain extrudable for six months or more) and yet will give tensile strengths upwards of 800 p.s.i. and tear strengths upwards of 150 pounds when cured. This represents a major advance in the one-component silicone rubber art.

This invention relates to an improved RTV silicone rubber composition consisting essentially of (1) An organosiloxane composition having bonded to the silicon atoms ketoxime groups of the formula —ON=X, in which X is a =$CR_2$ or

radical in which R is monovalent hydrocarbon or halohydrocarbon and R″ is divalent hydrocarbon or halohydrocarbon, said ketoxime groups being present in amount sufficient to cause the siloxane to cure to an elastomer, and substituents of the group hydrocarbon radicals and halohydrocarbon radicals and (2) From 25 to 55 parts by weight based on 140 parts of (1) of a carbon black having an average particle diameter of less than 50 millimicrons and a structure index of from 130 to 200.

Organosiloxane composition (1) employed in this invention are known materials and are described and claimed in U.S. Patent 3,189,576 by Edward Sweet, the disclosure of which is incorporated herein by reference. As is well known, if the composition is to be an elastomer, there should be approximately an average of two (i.e. from 1.9 to 2.01) monovalent hydrocarbon or monovalent halohydrocarbon radicals per silicon atom. As shown in said patent, the ketoxime group containing siloxanes suitable for curing to an elastomer can be made in several different ways. One involves mixing a silane of the formula $R'_bSi(ON=X)_{4-b}$ where $b$ has a value of 0 or 1 and R′ is a hydrocarbon or halohydrocarbon radical with a hydroxyl endblocked siloxane having a viscosity of at least 1,000 cs. at 25° C. and being of the formula $R'_cSiO_{4-c/2}$, where $c$ has an average value of approximately 2. A second method involves reacting a halogen ended siloxane having an average of at least 3 silicon-bonded halogen atoms per molecule with an oxime of the formula X=NOH in the presence of a hydrogen halide acceptor such as pyridine. In such a reaction, a ketoxime group will be substituted in each position for the silicon-bonded halogen and hydrogen chloride is a by-product.

A third method involves in the addition of silanes of the formula

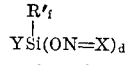

in which Y is an alkenyl radical and $f$ has a value of 0 to 1 with a siloxane containing SiH group in the presence of an addition catalyst such as chloroplatinic acid. This will cause addition of the alkenyl silane to the SiH to produce a siloxane containing the grouping

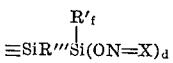

in each place in which an SiH group occurred in the original siloxane. The above three methods are merely exemplary of the possible ways of preparing composition (1) of this invention.

For the purposes of this invention the carbon black can be mixed with the siloxane (1) in various stages of the preparation thereof. For example, a siloxane containing the X=NO— groups already attached to the silicon can be mixed with the carbon black or one can mix the carbon black, a hydroxyl containing siloxane and a silane containing the ketoxime groups in any order. Under these conditions, the ketoxime silane in all probability reacts with the silicon-bonded hydroxyls to produce a siloxane containing the silicon-bonded ketoxime groups. However, under certain conditions it may be possible to mix the silane and the hydroxyl-containing siloxane under conditions where reaction does not occur in the absence of moisture. Applicants are not limited to any particular mechanism insofar as this invention is concerned. In any event, the definition of (1) is intended to read both on polymers containing the ketoxime group bonded to silicon and mixtures of hydroxylated siloxanes and silanes or siloxanes having ketoxime groups attached to silicon.

The primary substituents on the silicon atoms of (1) are the above defined ketoxime groups and hydrocarbon and/or halohydrocarbon groups. The latter can be either monovalent or polyvalent.

For the purpose of this invention, R'' can be any divalent hydrocarbon radical or divalent halohydrocarbon radical in which two valences are attached to the C of the C=NO— group. Thus, for example, R'' can be

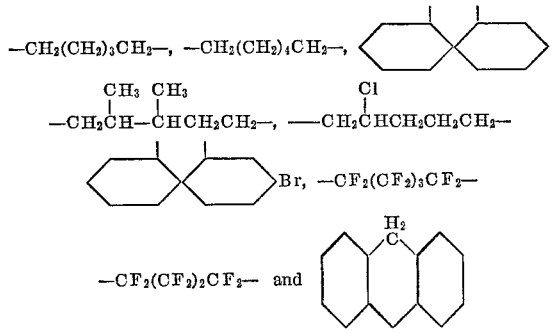

For the purpose of this invention, R can be any monovalent hydrocarbon radical or any halogenated monovalent hydrocarbon radical such as alkyl radicals such as methyl, ethyl, isopropyl, t-butyl, 2-ethylhexyl, dodecyl, 1-isobutyl-3,5-dimethylhexyl, octadecyl, and myricyl; any alkenyl radical such as vinyl, allyl, decenyl and hexadienyl; any cycloaliphatic hydrocarbon radical such as cyclopentyl, cyclohexyl and cyclohexenyl; any aryl hydrocarbon radical such as phenyl, naphthyl, and xenyl and any aralkyl hydrocarbon radical such as benzyl, phenylethyl, and beta-phenylpropyl and any alkaryl radical such as tolyl, xylyl, and methylnaphthyl. R can also be any halogenated monovalent hydrocarbon radical such as chloromethyl, 3,3,3-trifluoropropyl, 3,4-dibromocyclohexyl, α,α,α - trifluorotolyl, 2,4-dibromobenzyl, difluoromonochlorovinyl, α,β,β-trifluoro-α-chlorocyclobutyl, and 2-iodocyclopenten-3-yl.

For the purpose of this invention the hydrocarbon and halohydrocarbon groups attached to the silicon atom can be any of the above monovalent and divalent hydrocarbon and halohydrocarbon radicals specified for R and R''. This includes the radicals attached to the silicon atoms of both the siloxane and any silane present in (1).

The above groups comprise substantially all of the groups attached to silicon in (1). However, there can be attached to silicon small amounts of SiH groups, alkoxy groups or SiOH groups which may be present as impurities or as unreacted ingredients in the siloxane (1).

The carbon blacks, which when incorporated in the organosilicon compounds (1) give the improvement of this invention, are those carbon blacks having an average particle diameter of less than 50 millimicrons and which have a structure index from 120 and 200. Carbon blacks having particle sizes larger than those specified do not give the improved properties of this invention.

The structure index of a carbon black is the arithmetical value obtained by measuring the oil absorption of a carbon black and dividing that value by the oil absorption of a normal carbon of the same particle size. Thus, the structure index is a measure of the particle agglomeration of a particular carbon black. It has been found that carbon blacks having structure indices below the specified value do not give proper reinforcement, whereas those having a structure index above 200 produce compounds which are not extrudable and have very poor shelf life.

For a more detailed discussion of the structure of carbon blacks reference is made to "Introduction to Rubber Technology" by Maurice Morton (1959), pages 192–196.

As an example of how to determine a structure index of a carbon black, reference is made to page 196 of said publication. A carbon black having a particle size of say 31.9 millimicrons and an oil absorption of 140 ml. per 100 g. would have a high structure since a normal oil absorption for a carbon black of this particle size is about 82 ml. per 100 g. Thus, the structure index of the first carbon black is 140/82×100=170.

For the purpose of this invention the carbon black can be employed in amounts from 25 to 55 parts by weight based on 140 parts by weight of (1). Carbon blacks in amounts below 25 parts do not give strengths much different from the heretofore known one-component silicone rubber compositions. More than 55 parts by weight carbon black produces compositions which are no longer extrudable.

Another aspect of this invention is a process of producing improved compositions which involves mixing (1) a hydroxylated siloxane, (2) a silane of the formula

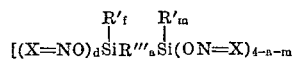

in which X and R' are as above defined, $d$ is an integer of from 1 to 3, $f$ is an integer from 0 to 3, $a$ is an integer from 0 to 4, $m$ is an integer from 0 to 2, the sum of $a+m$ being not greater than 4 and the sum of $d+(4-a-m)$ being at least 3 and R'' is a divalent aliphatic hydrocarbon radical and (3) the carbon black and thereafter heating the mixture at a temperature of from 75 to 200° C. for at least 30 minutes.

This procedure is particularly advantageous when employing the carbon black in amounts of from 25 to 40 parts by weight, although it can be employed ovre the entire range of carbon black. After heating has been completed, the composition is stored in the absence of moisture but will cure upon exposure to moisture to a tough rubber having better properties than is obtained when the carbon black is merely mixed with (1) without this preheating.

The silanes of the above structure can be prepared as shown above and as shown in the aforesaid Sweet patent.

It should be understood that in view of the moisture sensitivity of the silicon-bonded ketoxime groups, the compositions of this invention should be prepared and stored in the substantial absence of moisture. Under these conditions, the compositions are stable almost indefinitely but cure rapidly upon exposure to moisture.

If desired, the normal siloxane curing catalyst can be incorporated in the compositions of this invention. These include heavy metal salts of carboxylic acids such as dibutyltin diacetate, dibutyltin dilaurate, stannous octoate, ferric octoate, and the like.

The compositions of this invention are useful as caulking materials, coating compositions and for potting electrical equipment.

The following examples are illustrative only and should not be construed as limiting the invention which is properly delineated in the appended claims. The following abbreviations are used infra: Me for methyl, Et for ethyl, Vi for vinyl and Ph for phenyl.

EXAMPLE 1

Each of the compositions shown below was made by mixing the specified ingredients in the proportions shown in the substantial absence of moisture. The compositions were stored in containers and thereafter extruded and exposed to moisture to cause their curing. The physical properties of the cured rubbers are shown in the table below. Compositions 1 to 3 inclusive are within the scope of this invention. Compositions 4 to 8 inclusive are not within the scope of this invention but are included by way of comparison to show the improvement of this invention.

Composition 1

140 parts of a hydroxylated dimethylpolysiloxane of 12,500 cs. viscosity was mixed with 50 parts of a carbon black having an average particle diameter of 31.9 millimicrons and a structure index of 165 and with 10 parts by weight of the silane $C_2H_3Si(ON=CEtMe)_3$. The mixture was found to be stable in the absence of moisture and was readily extrudable from the container even after six weeks' storage. The product was extruded and allowed to cure and the properties are shown in the table below.

Composition 2

140 parts of the siloxane of composition (1) was mixed with 40 parts of the carbon black of composition (1) and 10 parts of the silane of composition (1) and the mixture was heated in the absence of moisture at 100° C. under vacuum for one hour. The resulting product was stable in the absence of moisture. It extruded readily from the tube and cured in the presence of moisture to give the properties shown below.

Employing the procedure of (2), the following formulations were prepared:

Composition 3

140 parts of the polymer of (1), 30 parts of the carbon black of (1), and 10 parts of the silane of (1).

Composition 4

140 parts of the polymer of (1), 20 parts of the carbon black of (1), and 10 parts of the silane of (1).

Composition 5

140 parts of the polymer of (1), 40 parts of a fume silica which had been treated with a dimethylcyclotrisiloxane, 10 parts of the silane of (1).

Composition 6

140 parts of the polymer of (1), 40 parts of carbon black having a particle size of 70 millimicrons and a structure index of 170, and 10 parts of the silane of (1).

Composition 7

140 parts of the polymer of (1), 40 parts of the carbon black of (1), and 10 parts of n-propylorthosilicate.

Composition 8

140 parts of the polymer of (1), 40 parts of the carbon black of (1) and 10 parts of methyltriacetoxysilane.

Composition 9

140 parts of the polymer of (1), 40 parts of a carbon black having a particle size of 38 millimicrons and a structure index of 300, and 10 parts of the silane of (1).

TABLE

| Sample No. | Durometer | Tensile in p.s.i. | Percent, Elongation | Tear Die B (pounds per inch) |
|---|---|---|---|---|
| 1 | 50 | 745 | 510 | 115 |
| 2 | 40 | 794 | 930 | 150 |
| 3 | 28 | 600 | 870 | 81 |
| 4 | 22 | 375 | 700 | 27 |
| 5 | (¹) | | | |
| 6 | 33 | 462 | 800 | 42 |
| 7 | 35 | 550 | 640 | 42 |
| 8 | 40 | 550 | 650 | 90 |
| 9 | (²) | | | |

¹ Too thick to extrude.
² Could not be extruded after one day in container.

EXAMPLE 2

Improved one-component RTV silicone rubbers are obtained when the following siloxanes are substituted for the methylsiloxane of formulation (1).

(1)
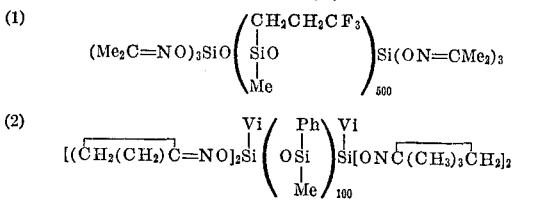

(2)
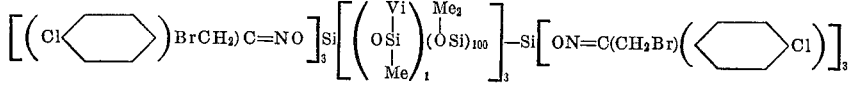

(3)
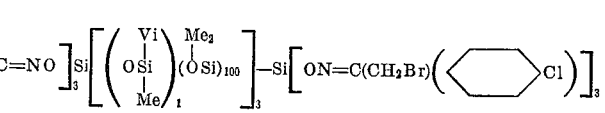

(4)
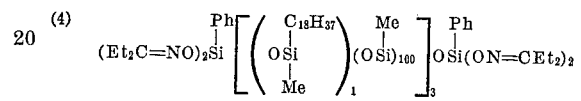

(5)
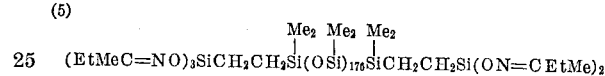

(6)
A mixture of 140 parts by weight of $HO(SiO)_{200}H$ and 10 parts by weight
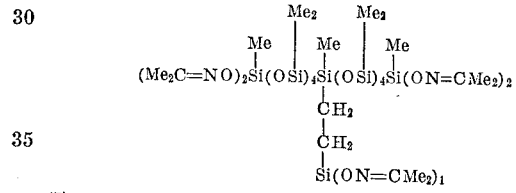

(7)
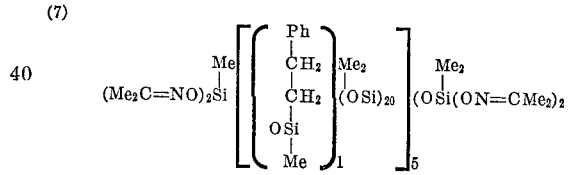

That which is claimed is:

1. An improved one-component room temperature vulcanizing silicone rubber composition consisting essentially of
    (1) an organosiloxane composition having bonded to the silicon atoms ketoxime groups of the formula —ON=X, in which X has the formula $=CR_2$ or
    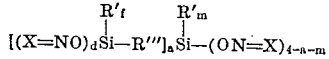
    radicals in which R is a monovalent hydrocarbon or monovalent halohydrocarbon radical and R" is a divalent hydrocarbon or halohydrocarbon radical, said ketoxime groups being present in amount sufficient to cause the siloxane to cure to an elastomer, and substituents of the group hydrocarbon radicals or halohydrocarbon radicals, and
    (2) from 25 to 55 parts by weight based on 140 parts of (1) of a carbon black having an average particle diameter of less than 50 millimicrons and a structure index of from 130 to 200.

2. A composition prepared by mixing in the substantial absence of moisture
    (1) a hydroxyl endblocked organopolysiloxane having a viscosity of at least 1,000 cs. at 25° C., and having per silicon atom on the average of about two silicon-bonded monovalent hydrocarbon or monovalent halohydrocarbon radicals;
    (2) a silane of the formula $$[(X=NO)_aSi-R''']_aSi-(ON=X)_{4-a-m}$$

in which
- $d$ is an integer from 1 to 3,
- $f$ is an integer from 0–3,
- $a$ is an integer from 0 to 4,
- $m$ is an integer from 0 to 2,
- the sum of $a+m$ being not greater than 4, the sum of $d+(4-a-m)$ being at least 3,
- X is of the formula $=CR_2$ or

radicals in which R and R' are independently monovalent hydrocarbon or monovalent halohydrocarbon radicals, R'' is a divalent hydrocarbon or divalent halohydrocarbon radical and R''' is a divalent aliphatic hydrocarbon radical, (2) being in amount sufficient to cause (1) to cure to an elastomer, and (3) from 25 to 55 parts per 140 parts of (1) of a carbon black having an average particle size of less than 50 millimicrons and a structure index of from 130 to 200.

3. A composition prepared by mixing in the substantial absence of moisture (1) a hydroxyl endblocked organopolysiloxane having a viscosity of at least 1,000 cs. at 25° C., having per silicon atom on the average of about two substituent monovalent hydrocarbon or monovalent halohydrocarbon radicals, (2) a silane of the formula

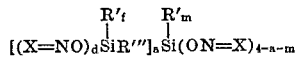

in which
- $d$ is an integer from 1 to 3,
- $f$ is an integer from 0 to 3,
- $a$ is an integer from 0 to 4,
- $m$ is an integer from 0 to 2,
- the sum of $a+m$ being not greater than 4, and sum of $d+(4-a-m)$ being at least 3,
- X is of the formula $=CR_2$ or

radicals in which R and R' are independently monovalent hydrocarbon or monovalent halohydrocarbon radicals, R'' is a divalent hydrocarbon or divalent halohydrocarbon radical, and R''' is a divalent aliphatic hydrocarbon radical, (2) being an amount sufficient to cause (1) to cure to an elastomer, and (3) from 20 to 55 parts per 140 parts of (1) of a carbon black having an average particle diameter of less than 50 millimicrons and a structure index of from 130 to 200, and thereafter heating the mixture at a temperature of from 75° to 200° C. for at least 30 minutes.

4. An improved one-component room temperature vulcanizing composition consisting essentially of (1) a methylsiloxane having bonded to silicon $$-ON=CR_2$$

groups in amount sufficient to cause (1) to vulcanize to an elastomer, R being an aliphatic hydrocarbon radical of 1 to 3 carbon atoms, in amount sufficient to cause (1) to vulcanize to elastomer, and (2) from 25 to 55 parts by weight based upon 140 parts by weight (1) of a carbon black having an average particle diameter of less than 50 millimicrons and a structure index of from 130 to 200.

5. A composition prepared by mixing (1) a hydroxyl endblocked dimethylpolysiloxane of at least 1,000 cs. viscosity at 25° C., (2) a silane of the formula $ViSi(ON=CEtMe)_3$ and (3) from 25 to 55 parts per 140 parts by weight of (1) of a carbon black having an average particle diameter of less than 50 millimicrons and a structure index of from 130 to 200.

References Cited

UNITED STATES PATENTS

| | | | |
|---|---|---|---|
| 3,184,427 | 5/1965 | Russell et al. | 260—18 |
| 3,189,576 | 6/1965 | Sweet | 260—33.8 |

MORRIS LIEBMAN, *Primary Examiner.*

J. E. CALLAGHAN, *Assistant Examiner.*